Patented Mar. 16, 1937

2,074,064

UNITED STATES PATENT OFFICE 2,074,064

MANUFACTURE OF MACARONI PRODUCTS

Olaf S. Rask, Baltimore, Md., assignor of one-half to Herbert C. Fooks, Baltimore, Md.

No Drawing. Application November 30, 1934, Serial No. 755,357

10 Claims. (Cl. 99—85)

I correct the dietary calcium deficiency of the farinaceous portion of macaroni products and also adjust macaroni products to pH values optimal or nearly optimal for the flavor, yellow color, strength and texture preferred in macaroni products by incorporating into macaroni products calcium in the form of either its oxide or its partly hydrated oxide, or its more or less completely hydrated oxide, preferably the last, that is, calcium hydroxide. As will be explained, I have discovered that the concentrations of calcium in the form of its oxide or hydroxide or any mixture of its oxide and hydroxide which will approximately and usually liberally correct the dietary calcium deficiencies of the farinaceous portions of macaroni products for adults or children,—these same concentrations of actual or potential $Ca(OH)_2$ will also adjust macaroni products to pH values or alkalinities optimal or nearly optimal for the yellow color, flavor, strength and texture preferred in macaroni products, and apparently also improve the keeping qualities of macaroni products by inhibiting insect life in them. Such a correction of the dietary calcium deficiency of the farinaceous portions of macaroni products and the simultaneous improvement or increase in the yellow color, as well as improvements otherwise in the flavor and strength preferred in macaroni products by pH adjustments as caused by the incorporated actual or potential $Ca(OH)_2$ are essentially the discoveries on which I am hereby petitioning for a patent.

An adult's daily calcium requirement is about 0.67 gram per day, and a growing child's daily calcium requirement is about 1.0 gram per day. The farinaceous portion (semolina and/or farina and/or flour) of macaroni products contains around 0.02% of calcium which is 0.168 gram per 840 grams, or about 3000 calories of the farinaceous portion of a macaroni product and 0.112 gram of calcium per 560 grams or about 2000 calories of the farinaceous portion of a macaroni product. Three thousand calories may be and usually is considered as an adult's daily energy requirement and 2000 calories a child's daily energy requirement. In view of these facts it may be said that the farinaceous portion of a macaroni product supplies only 0.168/0.67 or 25.0% of its share or quota of calcium for an adult and only 0.112/1.0 or 11.2% of its share or quota of calcium for a growing child. These fractions and percentages apply to macaroni products themselves when they consist only of farinaceous material or farinaceous material with a little salt as is the case of nearly all macaroni products now manufactured except egg noodles and some of the plain or water noodles. It would be advisable and beneficial, therefore, to increase the calcium content of macaroni products to 0.67 gram of calcium per 840 grams of their farinaceous portions to fulfill their calcium quotas when used for or by adults and to 1.0 gram of calcium per 560 grams of their farinaceous portions to fulfill their calcium quotas when used for children. On the percentage basis 0.67 gram per 840 grams is 0.0797% or approximately 0.080% and 1.0 gram per 560 grams is 0.178%, so that the calcium content of the farinaceous portions of macaroni products should be increased to 0.080% for adults and to 0.178%, or approximately 0.18% for children in order that the farinaceous portions of macaroni products may supply their calcium quotas for adults and children, respectively. Subtracting from these percentages 0.02%, the approximately average percentage of calcium contained naturally in the farinaceous portion of macaroni products, there remain 0.060% and 0.160% the percentages of calcium which should be added to or incorporated into the farinaceous portions of macaroni products in order to correct the dietary calcium deficiencies of these farinaceous portions for adults and children respectively. These percentages, viz 0.060% and 0.16% of the element calcium, are equivalent, respectively, to 0.111% and 0.296% of $Ca(OH)_2$ or 0.084% and 0.224% respectively of CaO. Accordingly, $Ca(OH)_2$ equivalent to 0.111% or CaO equivalent to 0.084% of the farinaceous portion of a macaroni product should be incorporated into a macaroni product in order to correct the dietary calcium deficiency of its farinaceous portion for adults. In order to correct the dietary calcium deficiency of the farinaceous portion of a macaroni product for children $Ca(OH)_2$ equivalent to 0.296% or CaO equivalent to 0.224% of its farinaceous portion should be incorporated into the macaroni product.

I have actually incorporated into various kinds of macaroni products or alimentary pastes made with different semolinas, farinas and flours and with different or various mixtures of these farinaceous materials, various concentrations of $Ca(OH)_2$ representing from 0.05% to 1.0% of their farinaceous portions. The incorporation of $Ca(OH)_2$ equivalent to 1.0 per centum of the farinaceous portion raises the calcium content of the farinaceous portion to 0.56 per centum after including the 0.02 per centum of calcium inherently contained in the farinaceous portion.

In so doing I have discovered that yellow color, flavor, strength, texture and probably other properties of macaroni products, such as resistances to attacks by insects, vermin, etc., are improved very considerably in those macaroni products made with the higher grades of semolina, farina, short patent flours or various mixtures of any two or all three of these farinaceous materials when $Ca(OH)_2$ is incorporated into these macaroni products in concentrations ranging usually between 0.12% and 0.20% of their farinaceous portions. In the case of macaroni products made with intermediary grades of semolina, or farina or straight flour or mixtures of any two or all three of these farinaceous materials I have obtained maximum improvements in color, flavor and strength of these (or the resulting) macaroni products by incorporating into them in the process of their manufacture concentrations of $Ca(OH)_2$ representing around 0.15% to 0.25% of their farinaceous portions. In the case of macaroni products made wholly or largely of clear flour, I have obtained certain improvements in color and strength, but not always in flavor, by incorporating into them $Ca(OH)_2$ representing around 0.25% to 0.40% of their farinaceous portions. Clear flours do not always make entirely satisfactory macaroni products when alkalinized with $Ca(OH)_2$ since some clear flour $Ca(OH)_2$ alkalinized macaroni products have flavors which are disliked by certain individuals. So far I have not encountered any farinaceous material which can be improved for manufacture into macaroni products by incorporating into it more than 0.4% of its weight of $Ca(OH)_2$. However, it seems conceivable that farinaceous materials may exist which can be improved for manufacture into macaroni products by incorporating into these farinaceous materials $Ca(OH)_2$ representing more than 0.4% of their weights. As already stated I have incorporated into alimentary pastes $Ca(OH)_2$ representing up to 1.0% of their farinaceous portions. However, these higher concentrations of $Ca(OH)_2$ did not, on the whole, seem to have any improving effects on the resulting macaroni properties over and above the improvements produced by concentrations of $Ca(OH)_2$ representing .4% or less of the farinaceous material.

I have also improved macaroni by incorporating into it a mixture consisting of about sixty percent calcium oxide and forty percent calcium hydroxide, the mixture representing 0.15% of the farinaceous material entering into the macaroni. I had also planned as an experiment to incorporate into macaroni products pure calcium oxide but I was unable by means of the facilities at my disposal to convert $Ca(OH)_2$ completely into CaO and keep it as such. The incorporation of calcium oxide or a mixture of calcium oxide and hydroxide into farinaceous materials ordinarily used in the manufacture of macaroni products amounts to nothing else than the incorporation of an equivalent quantity of calcium hydroxide especially if the calcium oxide incorporated represents 0.3% or less of the farinaceous material and if the farinaceous material contains at least 8% or more of hygroscopic moisture as commercial farinaceous materials invariably do contain. In such mixtures of calcium oxide and farinaceous material the calcium oxide is converted rapidly and practically completely into the hydroxide by combination with a small part of the hygroscopic water contained in the farinaceous material.

I have also incorporated varying concentrations of $Ca(OH)_2$ into egg noodles containing 5.5% of egg solids and into plain or water noodles containing egg solids less than 5.5%.

Improvements in yellow color, flavor, texture and strength of macaroni products as caused by the incorporation into them of $Ca(OH)_2$ or CaO are, in all probability, due in a large part to a specific effect or action of the calcium ion. However, these improvements are also due in a large part to the neutralization of acids or acidic constituents in the farinaceous materials and to the formation of a definite and more or less critical alkalinity in the macaroni products into which the $Ca(OH)_2$ or CaO has been incorporated. This particular alkalinity seems to be associated with or in some way responsible for or productive of and therefore critical for the color, flavor, strength and texture desired in macaroni products or the optimal and desired combination of these properties in macaroni products. Such an alkalinity can be determined and expressed in various more or less arbitrary ways. Personally, I prefer to express this alkalinity of macaroni products in terms of the pH of cooled water in which the macaroni product has been boiled for around fifteen to twenty minutes or until tender, according to the following details:

Drop about two ounces of the undried macaroni or about one and one half ounces, or about 40–45 grams of the dried macaroni whose pH or alkalinity is to be determined into about three fourths of a pint of already boiling and preferably distilled water. Continue the boiling for about fifteen to twenty minutes or until tender. Then promptly decant off into a previously cleaned and rinsed container and cool the boiling water and then at once determine its pH. For this purpose I have found satisfactory and convenient a Thymol Blue Comparator Block outfit which covers my preferred pH range in $Ca(OH)_2$ or CaO alkalinized macaroni products. For the determinations of pH values below 8.1 and above 9.5 which others may possibly or at least conceivably prefer in macaroni products other methods must be used. In this application the pH value of a macaroni product means the pH of a dried macaroni product unless undried is specified, and the pH of either a dried or an undried macaroni product is, by definition in this application, numerically equal to the pH of cooled water in which that macaroni product has been boiled for around fifteen to twenty minutes or until tender.

As already indicated, I have discovered that maximal improvements in the yellow color, flavor and strength preferred in macaroni products or maximal improvement in the combination of color, flavor and strength preferred in macaroni products are not produced by incorporating into macaroni products any particular or critical percentage of $Ca(OH)_2$ but by incorporating into any given macaroni product the quantity of $Ca(OH)_2$ necessary to produce in that particular macaroni product a critical pH value or a critical and relatively narrow range of pH values which are the same, or very nearly so, for all macaroni products regardless of the nature of the farinaceous materials from which they are made. This critical pH value or critical range of pH values associated with or causative of the preferred yellow color, flavor and strength in macaroni products will obviously be determined by personal and trade preferences for color and flavor and possibly also strength in macaroni products. As these preferences will vary a little but possibly not much, there will be correspondingly small variations in the pH value or range of pH values to which macaroni products should be alkalinized in order to meet different individual or various trade preferences. I, personally, prefer in macaroni products those properties which are associated with and therefore presumably caused, at least in part, by pH values of around 8.0 to 9.0, or more specifically a pH value not far from 8.5. In other words, I consider macaroni products alkalinized to pH values of around 8.0 to 9.0 by means of $Ca(OH)_2$ superior and preferable to macaroni products made from the same farinaceous materials but without the incorporation into them of any $Ca(OH)_2$. However, some individuals, manufacturers as well as consumers, may prefer macaroni products alkalinized by means of $Ca(OH)_2$ to pH values nearer to or possibly lower than 8.0, whereas others may prefer macaroni products alkalinized to pH values nearer to 9.0 or possibly even higher than 9.0, such as 9.5. I have prepared macaroni products having pH values of around 10.0 or probably a little more than 10.0 but these macaroni products seemed too alkaline.

It will be remembered that various concentrations of $Ca(OH)_2$ concentrations ranging from 0.12% to 0.40% of the farinaceous portions of macaroni products, were recommended for incorporation into macaroni products to improve them with respect to flavor, color and strength as well as to correct their dietary calcium deficiencies. These various concentrations of $Ca(OH)_2$ are the quantities of $Ca(OH)_2$ required to neutralize and alkalinize macaroni products to pH values of around 8.0 to 9.0. Obviously, this pH range is reached in any farinaceous material by a quantity of $Ca(OH)_2$ or any other alkali which varies with the acids or acidic substances and buffers contained in that farinaceous material, and so the quantity of $Ca(OH)_2$ required to neutralize and alkalinize a farinaceous material to a pH range of 8.0 to 9.0 varies with and is a measure of the acids and buffers or acid buffers contained in that farinaceous material. Accordingly the various concentrations of $Ca(OH)_2$ required to alkalinize macaroni products to a pH range of 8.0 to 9.0 vary with and are determined by the acid contents of the farinaceous materials.

In view of the foregoing discussion the actual industrial practice or application of this process of improving macaroni products is so simple and obvious that a further description of its seems almost superfluous. However, for illustrative purposes, I shall state briefly some of the ways in which I have actually used it. First, ascertain the concentration of the particular lot of $Ca(OH)_2$ to be used, which concentration of $Ca(OH)_2$ will be required to alkalinize the particular lot, such as a car load, of farinaceous material (semolina and/or farina and/or flour) to be made into a macaroni product, to the pH value desired in that macaroni product. As already stated, I, personally, prefer a pH value of about 8.5 altho other individuals or different trades may prefer higher or lower pH values in macaroni products. Whatever the desired value pH may be the concentration of the particular lot of $Ca(OH)_2$ to be used which will be required to produce the desired pH value in or with the particular lot of farinaceous material to be used may be determined as follows: Weigh out a series of 25 or 50 gram portions of the farinaceous material (semolina and/or farina and/or flour) to be used into each of five or six or seven 500 cc. to 1000 cc. Erlenmeyer flasks. To each of these weighed out samples of dry farinaceous material in the Erlenmeyer flasks add increasing concentrations of the dry powdered $Ca(OH)_2$ which is to be incorporated into the macaroni product, beginning preferably with 0.12% that is a concentration of $Ca(OH)_2$ representing 0.12% of the farinaceous material, in the first sample and increasing the concentration of $Ca(OH)_2$ by 0.02% in each succeeding sample until the concentration of added $Ca(OH)_2$ in the last sample is 0.20%, 0.22% or 0.24% of the farinaceous material. In the case of farinaceous materials suspected of being more acidic than the average the range of incorporated concentrations of $Ca(OH)_2$ in this test series might be from around 0.18% to 0.3% or possibly up to 0.4% of the farinaceous samples. Stir these dry $Ca(OH)_2$ containing farinaceous materials thoroughly and then add to each from 250 cc. to 500 cc. of water. Stir the resulting aqueous farinaceous $Ca(OH)_2$ treated mixtures thoroughly and frequently over a period of five to ten minutes and then place them, i. e. the Erlenmeyers containing them, on the steam bath for another five to ten minutes, preferably ten minutes, during which time they should be stirred several times. After this heat treatment cool the aqueous farinaceous $Ca(OH)_2$ treated mixtures to room temperature and allow solid matter to settle out of them as much as possible then decant off the supernatant aqueous liquid of each into small, cleaned and distilled water rinsed, containers preferably 100 cc. to 250 cc. pyrex Erlenmeyer flasks and then with the least delay possible determine the pH of each supernatant liquid. For this purpose I have found convenient a Thymol Blue Comparator Block outfit. However, if the preferred pH value is lower than 8.1 or higher than 9.5 other means must be used for the determinations of the pH values of these solutions or solution suspensions. The concentration of $Ca(OH)_2$ producing a pH of 8.5 or preferably in the above test series a pH of 8.7 is the concentration of $Ca(OH)_2$ which I personally prefer to incorporate into the first factory batch of farinaceous material. If this concentration of $Ca(OH)_2$ is 0.18% of the farinaceous material and if 280 pounds of farinaceous material is used in each factory batch, incorporate into the first factory batch of farinaceous material 8 ounces of $Ca(OH)_2$ which represent 0.178% or practically 0.18% of 280 pounds. These 8 ounces of dry powdered $Ca(OH)_2$ are sprinkled or dusted over the 280 pounds of dry farinaceous material after the latter has been placed in the mixing machine and preferably when the mixing machine is in operation. After adding these 8 ounces of $Ca(OH)_2$ to the 280 pounds of farinaceous material in the mixing machine allow the mixing machine to continue operating for a minute or two or until the dry powdered $Ca(OH)_2$ has been distributed uniformly throughout the dry farinaceous material. Then with the mixer in operation add any desired non-farinaceous material such as milk products and/or egg products and/or salt and then add the required or usual or slightly more than the usual amount of water and then proceed with and finish the manufacture of the macaroni product in the usual way. In a large portion of the macaroni products now manufactured no non-farinaceous materials are incorporated. In that case water is added when or immediately after the dry powdered $Ca(OH)_2$ has been distributed throughout the dry farinaceous material.

In order to verify the correctness of the amount of $Ca(OH)_2$ incorporated into this first factory batch and in order also to ascertain the alkali neutralizing capacity of the non-farinaceous materials if any were incorporated, determine the pH of a sample of this first factory batch of macaroni immediately after it comes out of the press and before its drying is begun. Usually the pH of this first factory batch of undried macaroni will be the same as that of the above experimental aqueous mixture of the same farinaceous material into which was mixed the same concentration of the $Ca(OH)_2$ as that incorporated into the above first factory batch if there has been no error and if any added non-farinaceous material did not have any appreciable $Ca(OH)_2$ absorbing or neutralizing capacity. However, this may be, the pH value of the first factory batch of undried macaroni will almost invariably be very close to the desired pH value; so close that the desired pH value can be attained in the second factory batch or certainly in the third by a process of trial and error in lowering or increasing as necessary the concentration of the incorporated $Ca(OH)_2$ by one half to one ounce of $Ca(OH)_2$ per 280 pounds of farinaceous material.

A macaroni manufacturer who has acquired considerable familiarity and experience with this process of improving macaroni products by incorporating $Ca(OH)_2$ into them will find it possible and practical to dispense with the above experimental test series in ascertaining the concentration of $Ca(OH)_2$ required in any given lot of farinaceous material to produce the desired pH value in the macaroni into which that farinaceous material is made. Instead he can and probably will make his first factory batch of macaroni (from any lot of farinaceous material) by incorporating into that first factory batch 7, 8, or 9 ounces, preferably 8 ounces, of $Ca(OH)_2$ per 280 pounds of farinaceous material. The pH of this first factory batch in the undried condition will indicate with sufficient exactness to an experienced macaroni manufacturer (experienced with this process) to what extent the concentration of $Ca(OH)_2$ must be increased or decreased (over or below that incorporated into the first factory batch) to produce the desired pH in macaroni made from this particular lot of farinaceous material. It is very desirable or almost necessary to recheck the pH value of $Ca(OH)_2$ alkalinized macaroni products after they have dried. Dried $Ca(OH)_2$ alkalinized macaroni products will have pH values which are very little lower than the pH values they had before drying if their drying has been properly conducted. Properly conducted drying of $Ca(OH)_2$ alkalinized macaroni products should not and usually will not reduce their pH values by more than around 0.1 of a pH unit below what their pH values were before drying. However, undesirably slow drying may reduce the pH value by a whole unit. I have observed a macaroni having a pH of about 9.0 in the undried condition and a pH of about 8.0 in the dried condition, this decrease in alkalinity being due apparently to unnecessarily and undesirably slow drying. These changes or decreases in the pH which macaroni products undergo in drying may therefore serve the macaroni manufacturer as an index to the correctness of his drying methods. He may find it advisable and very helpful to adjust and control his drying operations so as to cause the least possible decrease in the pH of his $Ca(OH)_2$ alkalinized macaroni products and also other macaroni products not alkalinized with $Ca(OH)_2$. In this connection it seems desirable to standardize the incorporation of $Ca(OH)_2$ into macaroni products on their pH values in their dried rather than undried conditions. I, personally, prefer macaroni products so alkalinized with $Ca(OH)_2$ that they will have pH values of around 8.3 to 8.5 after they have been dried. To be assured of such pH values in dried macaroni products I usually incorporate such concentrations of $Ca(OH)_2$ as will produce a pH of around 8.5 to 8.7 in the undried products so as to allow a decrease of 0.1 to 0.2 of a pH value for drying.

When $Ca(OH)_2$ alkalinized macaroni products become six weeks to two months old or older they will under certain conditions lose some of their alkalinities. I have encountered one macaroni which had a pH of around 9.0 immediately after drying and a pH of about 8.0 two months later. However, such a decrease in alkalinity of $Ca(OH)_2$ alkalinized maraconi products will obviously not affect or lower their calcium contents. Neither do such decreases in the alkalinities of $Ca(OH)_2$ alkalinized macaroni products reduce appreciably the extra yellow color which was imparted into them by the incorporated $Ca(OH)_2$.

Instead of the above dry incorporation of $Ca(OH)_2$ or $CaO$ into the farinaceous material the required $Ca(OH)_2$ or $CaO$ can be suspended and partly dissolved in the water to be used in the macaroni dough before it is poured on to the farinaceous material. However, I personally prefer dry mixing.

It seems pertinent to note, as a part of this application, that the applicant in 1920 observed, that ammonia water brought out a yellow color in wheat flour suspensions in about 65% alcohol, which yellow color was lacking in wheat flour suspensions in 65% alcohol containing no ammonia. This yellow color brought out by ammonia is apparently the same as that brought out in macaroni doughs alkalinized with lime although it didn't occur to the applicant until considerably later to utilize alkalinization as a means of increasing the yellow color in macaroni products.

In this application and in the appended claims the terms farinaceous material and farinaceous materials are used interchangeably. Each or either term means semolina, or farina or flour, or any mixture of any two or all three of these. The terms semolina, farina and flour denote different milled products of various varieties of wheats, including durum wheats. Farinaceous materials containing appreciable or substantial concentrations of vegetable material not milled from wheat or farinaceous material containing appreciable concentrations of leguminous products or products of the soy bean are excluded from products referred to in this application by the terms farinaceous material, semolina, farina or flour.

In this specification the terms "alkalinize" and "alkalinized" mean, to make alkaline, and, made alkaline, respectively; and "alkaline" means in the pH terminology, the pH range beginning at a pH of 7.0 and extending upward above 7.0.

In this application and in the appended claims the terms macaroni, macaroni products and alimentary pastes are used interchangeably. Each or any one of these terms by itself denotes macaroni, spaghetti, vermicelli, the various flat goods, the various "short goods" like elbow macaroni, soup rings, sea shells; also plain noodles, egg noodles and all other alimentary pastes composed either mainly or entirely of farinaceous material with or without salt and/or egg solids, and/or egg white and/or egg yolk and/or milk solids and/or other milk products in accordance with federal definitions and standards for macaroni products or alimentary pastes. However, any or all of the improvements as herein disclosed may be included in any or all of said definitions. Food compositions containing appreciable or substantial concentrations of vegetable materials other than semolina and/or farina and/or flour are not included among products designated in this application and in the appended claims by the terms macaroni, macaroni products or alimentary pastes. However, these terms should be construed in this application and in the appended claims as including alimentary pastes modified by containing or by being composed from inappreciable concentrations (probably up to around 5%) of non-wheat vegetable material like soy bean meal and/or peanut flour and/or corn flour and/or oats flour and/or sorghum grains flour and/or barley flour and/or potato flour and/or rice flour and/or other non-wheat vegetable material along with wheat material as the main constituent, since it comes within the scope and spirit of the inventions and discoveries disclosed by this application to alkalinize and otherwise modify by means of lime, as discussed in this application, pastes subsequently pressed and dried, the vegetable portions of which contain or are composed from at least 95% wheat material and not over 5% of vegetable non-wheat material. It might even come within the scope and spirit of these discoveries to alkalinize with lime any composition consisting essentially of wheat material along with any concentrations of other vegetable materials whenever these concentrations of non-wheat materials are not sufficiently high to alter appreciably the character of the product as due to the wheat material.

In the following claims the word "lime" means and is used to denote $Ca(OH)_2$ or $CaO$ or any mixture of $Ca(OH)_2$ and $CaO$.

In the following claims the expression "wheat products" means substances from or of semolina and/or farina and/or flour milled from wheat.

I claim:

1. A macaroni product the vegetable substances in which macaroni product are at least 95 per centum wheat products, which macaroni product has a pH of 7.0 to 10.0.

2. A process of increasing the yellow color in a macaroni product, the vegetable substances in which macaroni product are at least 95 per centum wheat products, which process comprises mixing lime with the raw material, preparing a dough from the resulting limed mixture, kneading and then pressing the dough into the shape of a macaroni product and then drying it, using such a quantity of lime as will produce a pH of 8.0 to 9.0 in said macaroni product.

3. A process of increasing the strength in a macaroni product, the vegetable substances in which macaroni product are at least 95 per centum wheat products, which process comprises mixing lime with the raw material, preparing a dough from the resulting limed mixture, kneading and then pressing the dough into the shape of a macaroni product and then drying it, using such a quantity of lime as will produce a pH of 8.0 to 9.0 in said macaroni product.

4. A process of controlling the properties of a macaroni product, the vegetable substances in which macaroni product are at least 95 per centum wheat products, which process comprises mixing lime with a raw material, preparing a dough from the resulting limed mixture, kneading and then pressing the dough into the shape of a macaroni product and then drying it, using such a quantity of lime as will produce a pH of 7.0 to 10.0 in said macaroni product.

5. A macaroni product the vegetable substances in which macaroni product are at least 95 per centum wheat products, which macaroni product has a pH of 8.0 to 9.0.

6. A process of manufacturing a macaroni product, the vegetable substances in which macaroni product are at least 95 per centum wheat products, which process comprises mixing lime with the raw material, the weight of the lime used being equivalent as $Ca(OH)_2$ to 0.05 per centum to 0.40 per centum of the weight of the dry farinaceous material entering into said macaroni product, preparing a dough from the resulting limed mixture, kneading and then pressing the dough into the shape of a macaroni product and then drying it.

7. A process of manufacturing a macaroni product, the vegetable substances in which macaroni product are at least 95 per centum wheat products, which process comprises mixing lime with the raw material, the weight of the lime used being equivalent as $Ca(OH)_2$ to 0.05 per centum to 0.25 per centum of the weight of the dry farinaceous material entering into said macaroni product, preparing a dough from the resulting limed mixture, kneading and then pressing the dough into the shape of a macaroni product and then drying it.

8. A process of manufacturing a macaroni product, the vegetable substances in which macaroni product are at least 95 per centum wheat products, which process comprises preparing a dough with water containing $Ca(OH)_2$ equal in weight to 0.05 per centum to 0.40 per centum of the weight of the dry farinaceous material entering into the said macaroni product, kneading and then pressing the dough into the shape of a macaroni product and then drying it.

9. A process of manufacturing a macaroni product, the vegetable substances in which macaroni product are at least 95 per centum wheat products, which process comprises preparing a dough with water containing $Ca(OH)_2$ equal in weight to 0.05 per centum to 0.25 per centum of the weight of the dry farinaceous material entering into said macaroni product, kneading and then pressing the dough into the shape of a macaroni product and then drying it.

10. A macaroni product the vegetable substances in which macaroni product are at least 95 per centum wheat products, which macaroni product is alkaline and contains 0.08 per centum to 0.56 per centum of calcium.

OLAF S. RASK.